(12) United States Patent
Ma

(10) Patent No.: US 7,726,194 B2
(45) Date of Patent: Jun. 1, 2010

(54) VIBRATION TEST DEVICE

(75) Inventor: Jun-Chao Ma, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 291 days.

(21) Appl. No.: 11/871,168

(22) Filed: Oct. 12, 2007

(65) Prior Publication Data

US 2009/0056458 A1    Mar. 5, 2009

(30) Foreign Application Priority Data

Aug. 29, 2007    (CN) .................... 2007 2 0200897 U

(51) Int. Cl.
*B06B 3/00* (2006.01)

(52) U.S. Cl. .......................................... 73/663; 73/570

(58) Field of Classification Search .................... 73/662, 73/663, 570; 248/27.1, 298.1
See application file for complete search history.

(56) References Cited

U.S. PATENT DOCUMENTS

| 3,164,984 | A  | * | 1/1965  | Gertel ......................... 73/665 |
| 6,131,461 | A  | * | 10/2000 | Leist ............................ 73/662 |
| 6,535,007 | B2 | * | 3/2003  | Haas et al. .................. 324/755 |
| 6,616,106 | B1 | * | 9/2003  | Dean et al. ................. 248/27.1 |
| 7,282,925 | B2 | * | 10/2007 | Alperin et al. ............. 324/538 |

* cited by examiner

*Primary Examiner*—J M Saint Surin
(74) *Attorney, Agent, or Firm*—Frank R. Niranjan

(57) ABSTRACT

A vibration test device for an electronic device(40) includes a test platform (10), and at least a pair of holders (20) attached to the platform. The test platform is capable of vibrating along any predetermined direction, and at any predetermined frequency. Each of the holders includes a pair of parallel base brackets(22) attached to the platform, and a mounting bracket (24) attached to the base brackets for mounting the electronic device. The holders and the electronic device are capable of vibrating together with the test platform.

20 Claims, 6 Drawing Sheets

VIBRATION TEST DEVICE

BACKGROUND

1. Technical Field

The present invention relates to a vibration test device, and more particularly to a vibration test device for electronic devices of different sizes.

2. General Background

Blade servers slidably attached between opposite slide racks in a blade system case usually vibrate during operation. If the blade servers' chassis or the slide racks are deformed due to the vibration, electronic devices, such as motherboards, in the chassis of the blade servers may be damaged. Thus, the chassis and the slide racks should be tested before being used to ensure whether they can endure vibration.

A conventional vibration test device includes a test platform, and a pair of holders attached to the test platform. Each of the holders has a pair of mounting flanges extending perpendicularly from two opposite ends thereof respectively, for securing a slide rack therebetween. The test platform can vibrate along any predetermined direction, at any predetermined frequency. In use, a server is fixed between the slide racks of the holders. When the platform vibrates, the server also vibrates. After a certain period of time, an amount of deformation of the server chassis can be observed. However, the holders of the vibration test device are very big and weighty. It is difficult to mount the holders on the test platform. Furthermore, the holders can only be used to secure one size of slide racks. When servers of other sizes are tested, slide racks and holders must be changed correspondingly.

What is needed, therefore, is a vibration test device having a simplified configuration and adapting for testing different size servers.

SUMMARY

A vibration test device for an electronic device includes a test platform, and at least a pair of holders attached to the platform. The test platform is capable of vibrating along any predetermined direction, and at any predetermined frequency. Each of the holders includes a pair of parallel base brackets attached to the platform, and a mounting bracket attached to the base brackets for mounting the electronic device. The holders and the electronic device are capable of vibrating together with the test platform.

Other objects, advantages, and novel features of the present invention will be drawn from the following detailed description of a preferred embodiment of the present invention with the attached drawings, in which:

DETAILED DESCRIPTION

Figure 1:
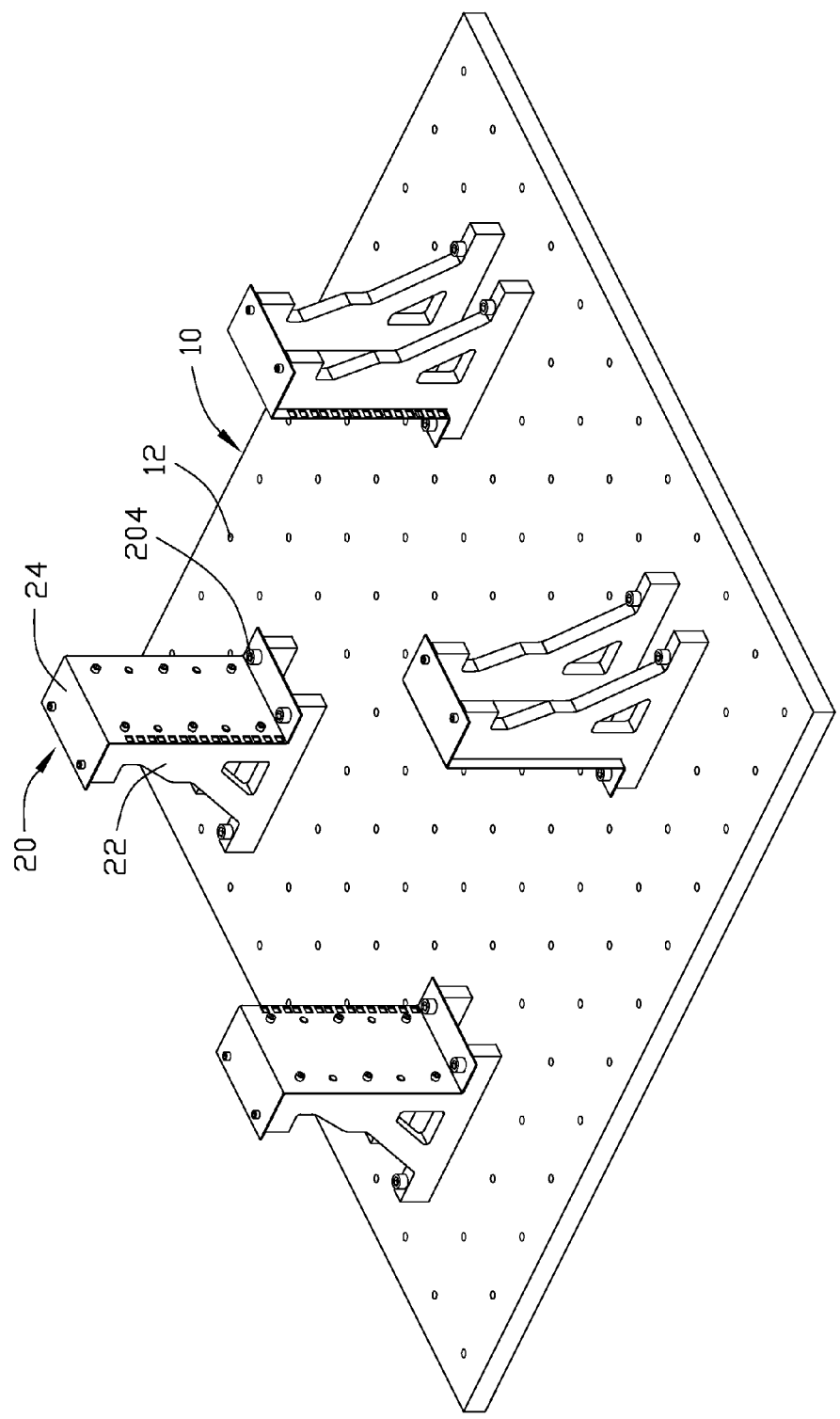
FIG. 1 is an isometric view of a vibration test device in accordance with a preferred embodiment of the present invention, the vibration test device including a test platform, and a plurality of holders attached to the test platform.

Referring to FIG. 1, a vibration test device in accordance with an embodiment of the present invention includes a test platform 10, and two pairs of opposite holders 20.

A plurality of mounting holes 12 arranged in a matrix is defined in the platform 10.

Figure 2:
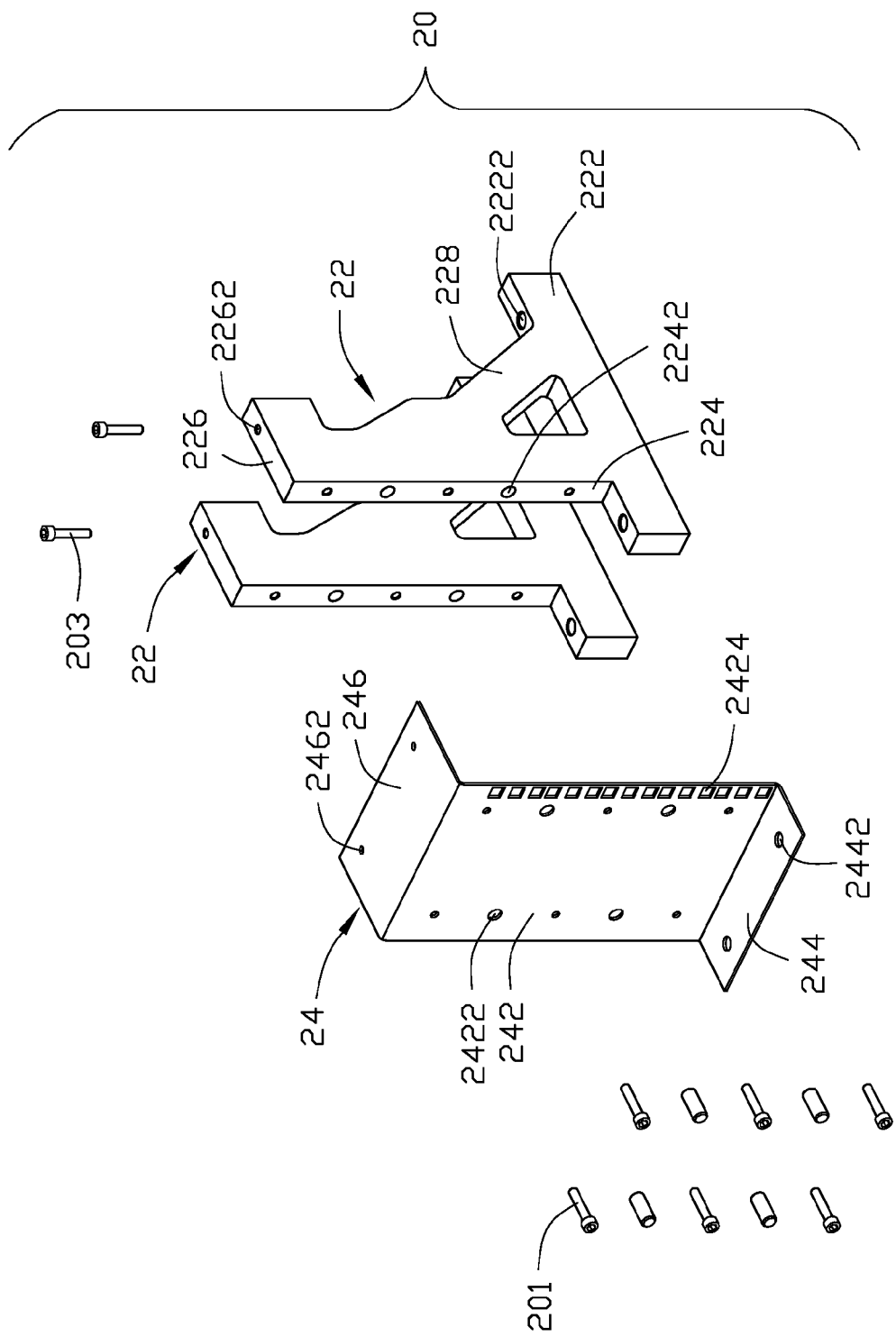
FIG. 2 is an exploded view of one of the holders of FIG. 1.

Referring to FIG. 2, each of the holders 20 includes a pair of symmetrical base brackets 22 and a mounting bracket 24 detachably attached to the base brackets 10. Each of the base brackets 22 includes a bottom section 222, a top section 226 parallel to the bottom section 222, and a connecting section 224 together with a slanting rib 228 connected between the bottom section 222 and the top section 226. The connecting section 224 is perpendicularly connected between the bottom section 222 and the top section 226. Two securing holes 2222 are defined in the bottom section 222 at two sides of the connecting section 224 and the slanting rib 228. A plurality of mounting holes 2242 is defined in the connecting section 224 and arranged along a direction perpendicular to the bottom section 222. A fixing hole 2262 is defined in the top section 226. The mounting bracket 24 includes a connecting panel 242, a lower flange 244 perpendicularly extending from a bottom edge of the connecting panel 242 towards a first direction, and an upper flange 246 perpendicularly extending from a top edge of the connecting panel 242 towards a second direction opposite to the first direction. Two lengthways rows of mounting holes 2422 are defined in the connecting panel 242 corresponding to the mounting holes 2242 of the paired base brackets 22. A plurality of rectangular holes 2424 is defined in the connecting panel 242 in a line adjacent to one side edge of the connecting panel 242. A pair of through holes 2442 is defined in the lower flange 244 corresponding to the securing holes 2222 beside the connecting sections 224 of the paired base brackets 22. A pair of through holes 2462 is defined in the upper flange 246 of the mounting bracket 24 corresponding to the fixing holes 2262 of the top sections 226 of the paired base brackets 22.

Figure 3:
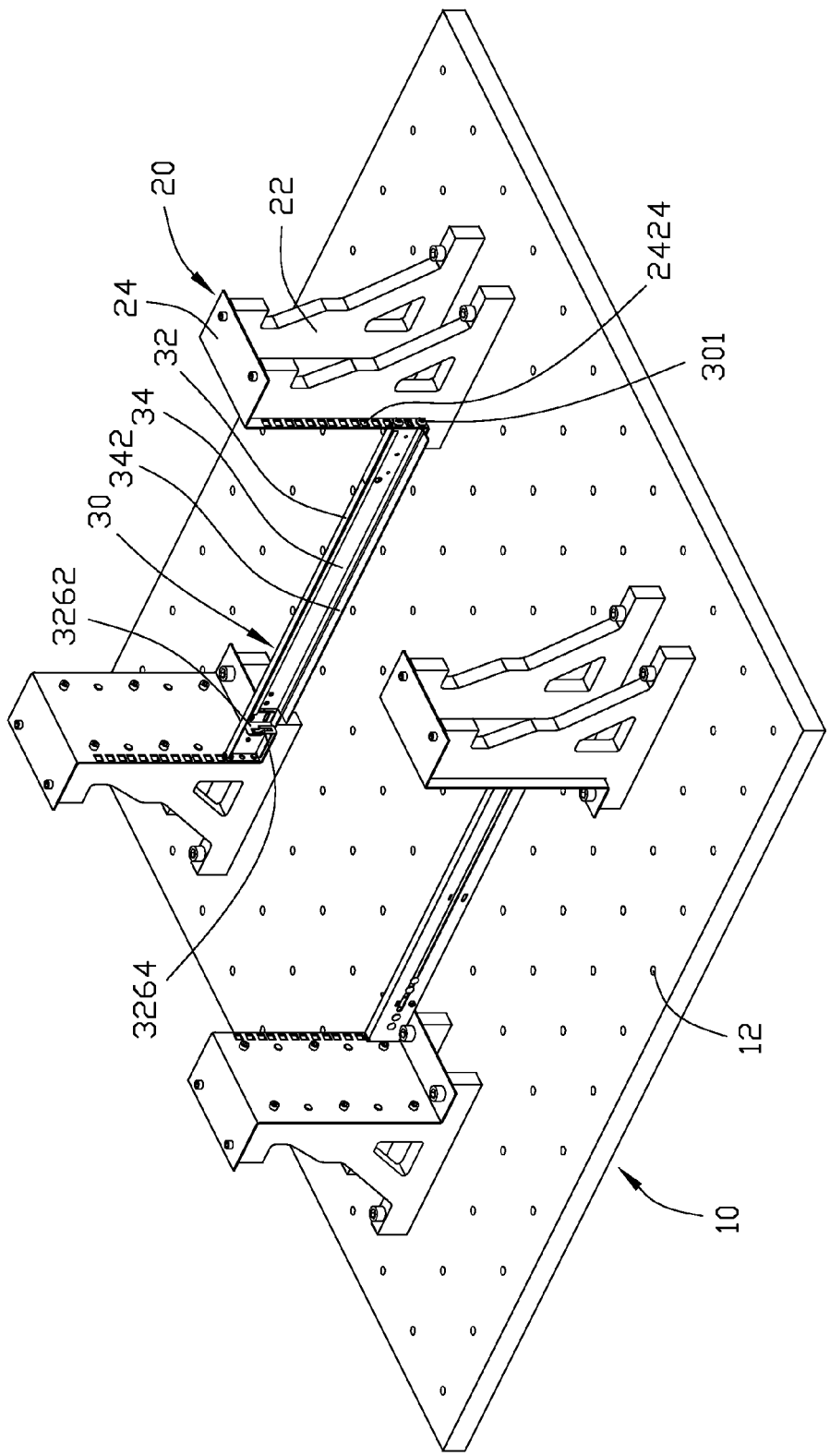
FIG. 3 is an assembled view of the vibration test device of FIG. 1 and a pair of slide racks attached thereto.
Figure 4:
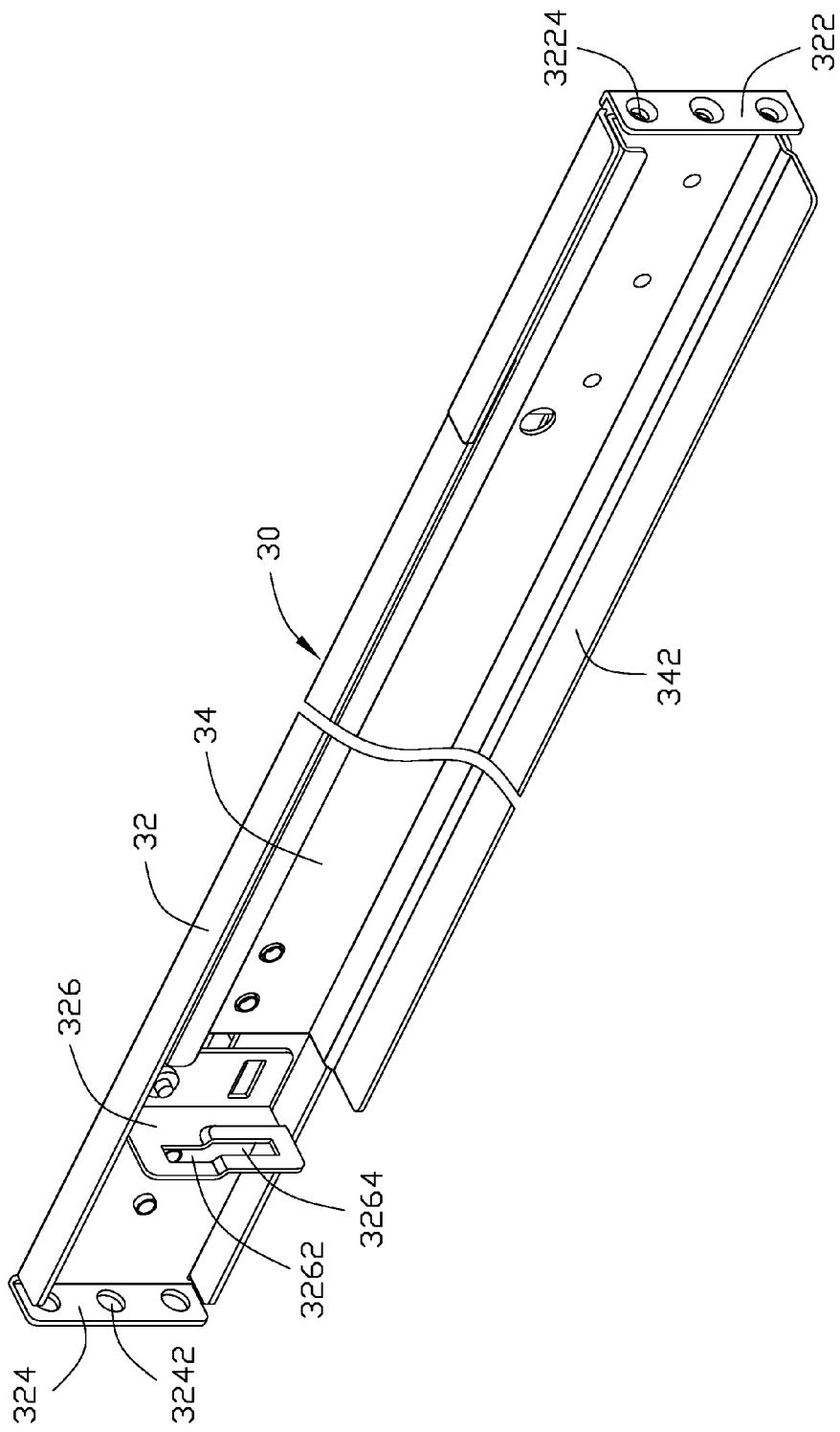
FIG. 4 is an enlarged view of one of the slide racks of FIG. 3.

Referring to FIGS. 3-4, a pair of opposite slide racks 30 is attached between two pairs of the holders 20 respectively. Each of the slide racks 30 includes a first slide 32, and a second slide 34 slidably attached to the first slide 32. The first slide 32 has a first end flange 322 with securing holes 3224 defined therein, and a second end flange 324 with securing holes 3242 defined therein corresponding to the rectangular holes 2424 of the mounting bracket 24 of the holder 20. A fixing member 326 is attached to an interior surface of the first slide 32 at the second end. The fixing member 326 includes a securing piece 3262 perpendicular to the interior surface of the first slide 32. A lateral slot 3264 is defined in the securing piece 3262 of the fixing member 326. The second slide 34 includes a support flange 342 extending from a lower edge thereof.

Figure 5:
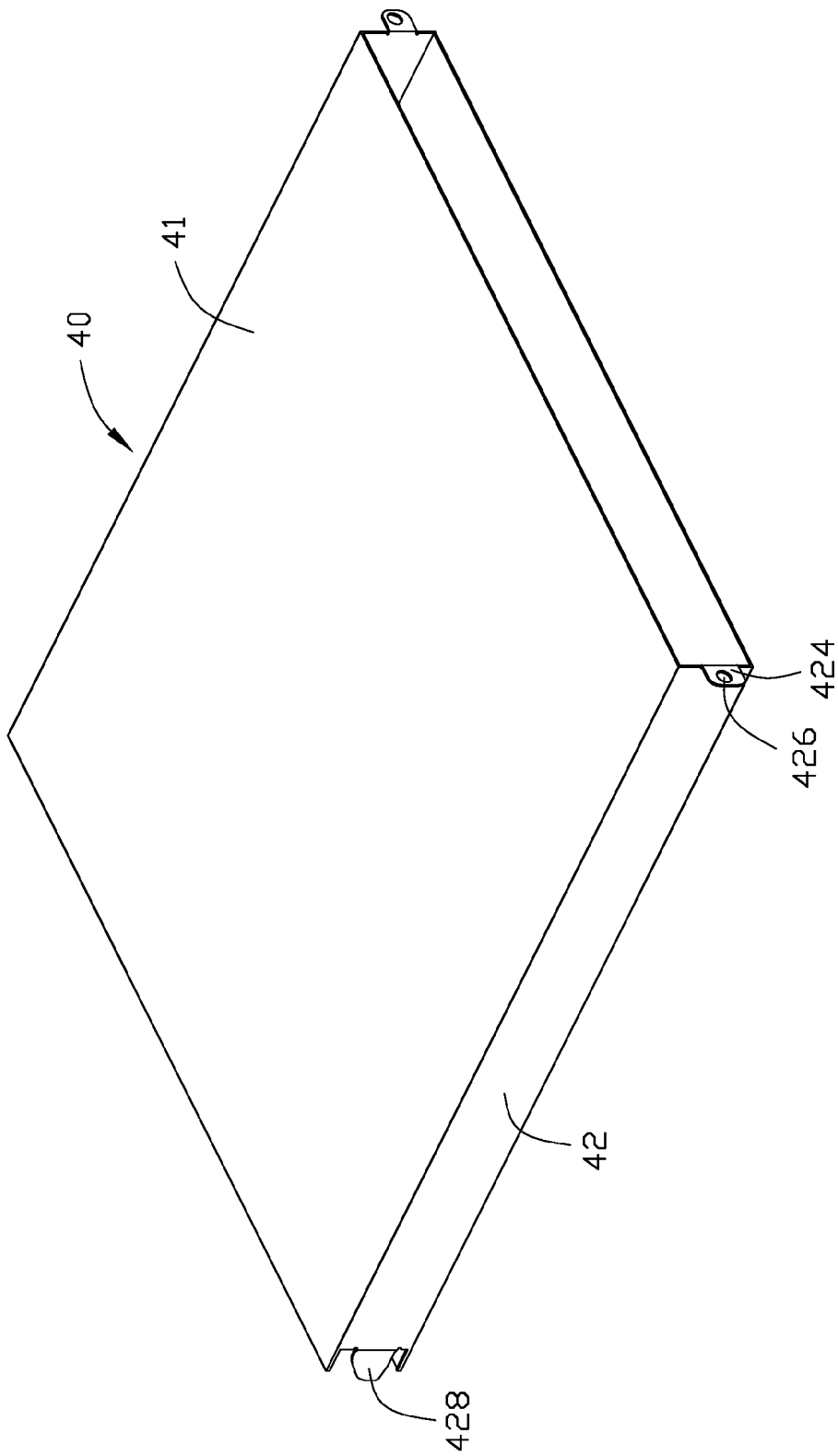
FIG. 5 is an isometric view of a server.

Referring to FIG. 5, a server 40 includes a chassis 41. Electronic devices (not shown), such as a data storage device, a fan, a motherboard, etc. may be installed in the chassis 41. The chassis 41 includes a pair of sidewalls 42. Each of the sidewalls 42 has a protruding piece 424 perpendicularly extending from a front end thereof. A mounting piece 428 protrudes from a rear end of each of the sidewalls 42 perpendicular to the protruding piece 424. A mounting hole 426 is defined in the protruding piece 424 of each of the sidewalls 42.

In assembly of each of the holders 20, the mounting holes 2422 of the mounting bracket 24 are aligned with the mounting holes 2242 of the paired base brackets 22. The through holes 2462 of the mounting bracket 24 are aligned with the fixing holes 2262 of the paired base brackets 22. The through holes 2442 of the mounting bracket 24 are aligned with the securing holes 2222 beside the connecting sections 224 of the base brackets 22. A plurality of securing members, such as screws 201, is inserted into the mounting holes 2422 of the mounting bracket 24 and the mounting holes 2242 of the base brackets 22, and two screws 203 are inserted into the through holes 2462 of the mounting bracket 24 and the fixing holes 2262 of the paired base brackets 22. Thus, the mounting bracket 24 is securely attached to the paired base brackets 22.

In assembly of the assembled holders 20, each of the holders 20 are located at a predetermined position according to a size of the server 40. The securing holes 2222 of the bottom sections 222 of the holders 20 are aligned with the selected mounting holes 12 of the test platform 10. A plurality of screws 204 (See FIG. 1) are inserted through the securing holes 2222 of the holders 20 and the selected mounting holes 12 of the test platform 10. Thus, the holders 20 are securely attached to the test platform 10. The mounting brackets 24 of each pair of opposite holders 20 face to each other symmetrically.

Figure 6:
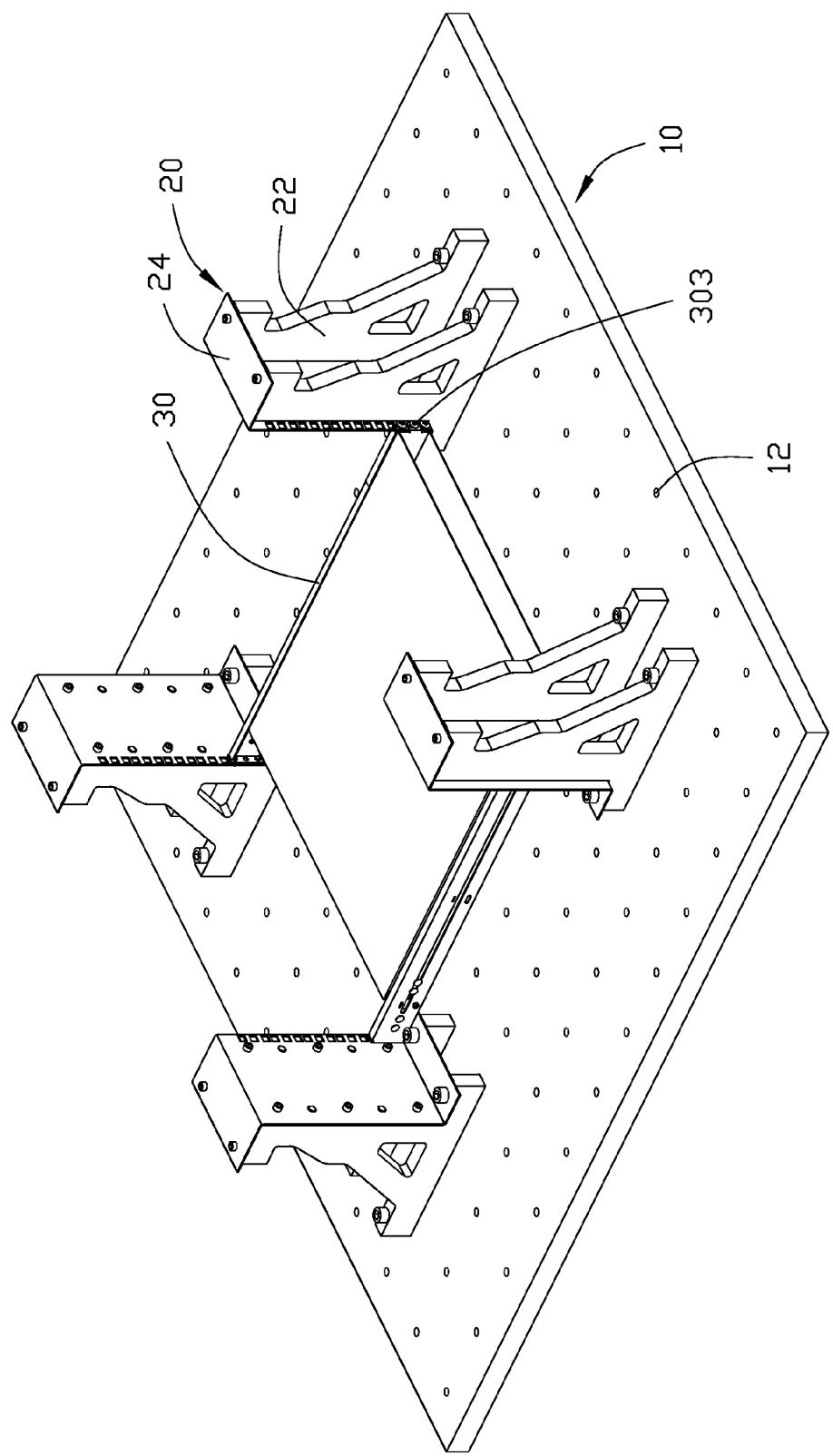
FIG. 6 is an assembled view of the vibration test device with slide racks attached thereto of FIG. 3 and the server of FIG. 5

Referring also to FIG. 6, in assembly of the slide racks 30, the securing holes 3224 and 3242 of each of the slides racks 30 are aligned with the rectangular holes 2424 of two opposite holders 20. A plurality of screws 301 (See FIG. 3) is inserted through the securing holes 3224 and 3242 of the slides racks 30 and the rectangular holes 2424 of the holders 20. Thus, each of the slide racks 30 is attached between one pair of opposite holders 20.

Before test, the server 40 is supported on the support flanges 342 of the second slides 34 of the slide racks 30. The mounting pieces 428 of the server 40 are engaging into the slots 3264 of the slide racks 30. The protruding pieces 424 are resisted against the connecting panels 242 of the mounting brackets 24 of the holders 20. The mounting holes 426 of the protruding pieces 424 are aligned with the rectangular holes 2424 of the connecting panels 242. A plurality of screws 303 (See FIG. 6) is inserted through the mounting holes 426 of the server 40 and the respective rectangular holes 2424 of the holders 20. Thus, the server 40 is secured between the slide racks 30.

During testing, the test platform 10 may vibrate along a random direction, at a frequency in a predetermined range, such as 10-500 Hz. The holders 20 and the server 40 vibrate together with the test platform 10. After a predetermined time period, such as an hour, the vibration is stopped. Then, deformations of the chassis 41 of the server 40 and the slide racks 30 are observed to ensure whether the chassis 41 and the slide racks 30 can endure such vibration.

Since the mounting bracket 24 and the base brackets 20 of each of the holders 20 are detachable and structured simply, the holders 20 are easily attached to the test platform 10 at various positions to accommodate various sizes of servers.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of sections within the principles of the invention to the full extent indicated by the broad general meaning of the terms in which the appended claims are expressed.

What is claimed is:

1. A vibration test device for various sizes of electronic devices, comprising:
    a test platform configured for vibrating along a predetermined direction, and at a predetermined frequency; and
    two pairs of opposite holders attached to the platform for vibrating together with the test platform, each of the holders comprising a pair of base brackets removably attached to the platform, and a mounting bracket removably attached to the base brackets for mounting the electronic devices;
    wherein the holders are capable of being attached on the platform at various positions to accommodate the various sizes of electronic devices.

2. The vibration test device as described in claim 1, wherein each of the base brackets of the holder comprises a bottom section, and a connecting section formed on the bottom section, and the mounting bracket is attached to the connecting sections of the base brackets of the holder.

3. The vibration test device as described in claim 2, wherein the connecting section is perpendicular to the bottom section of each of the base brackets of the holder.

4. The vibration test device as described in claim 2, wherein a plurality of securing holes is defined in the test platform, a plurality of securing holes being defined in the bottom sections of each base bracket, a plurality of fixing members being inserted through the securing holes of each base bracket and the platform for securing each base bracket on the test platform.

5. The vibration test device as described in claim 4, wherein the securing holes of the test platform are arranged in a matrix.

6. The vibration test device as described in claim 2, wherein each of the base brackets of the holder further comprises a top section parallel to the bottom section connecting with a top end of the connecting section, and a slanting rib connecting between the top section and the bottom section thereof.

7. The vibration test device as described in claim 6, wherein the mounting bracket of each of the holders comprises a connecting panel attached to the connecting sections of the base brackets of the holder, a lower flange of the connecting panel attached to the bottom sections of the base brackets of the holder, and an upper flange of the connecting panel attached to the top sections of the base brackets of the holder.

8. The vibration test device as described in claim 7, wherein the lower flange and the upper flange extend perpendicularly from opposite directions from a lower edge and an upper edge of the connecting panel of the mounting bracket respectively.

9. The vibration test device as described in claim 7, wherein a plurality of holes is arranged in a line near a side edge of the connecting panel of each of the mounting brackets for mounting slide racks of the electronic devices.

10. A vibration test assembly, comprising:
    a test platform configured for vibrating along a predetermined direction, and at a predetermined frequency;
    two pairs of opposite holders removably attached to the test platform and located respectively beside four corners of an electronic device; and
    a pair of slide racks with the electronic device mounted therebetween, each of the slide racks being attached to one pair of opposite holders;
    wherein the two pairs of opposite holders are capable of being attached to the test platform at various positions, a distance between the two pairs of opposite holders is variable to accommodate various sizes of electronic devices.

11. The vibration test assembly as described in claim 10, wherein each of the holders comprises a pair of parallel base brackets attached to the test platform, and a mounting bracket attached to the base brackets for mounting the electronic device.

12. The vibration test assembly as described in claim 11, wherein each of the base brackets includes a bottom section attached to the test platform, a top section parallel to the bottom section, and a connecting section perpendicularly connected between the bottom section and the top section, the mounting bracket comprising a connecting panel attached to the connecting sections of the base brackets of the holder.

13. The vibration test assembly as described in claim 12, wherein the mounting bracket further comprises a lower flange extending from a lower edge of the connecting panel thereof and attaching on the bottom sections of the base brackets of the corresponding holder, and an upper flange extending from an upper edge of the connecting panel thereof and attaching on the top sections of the base brackets of the corresponding holder.

14. The vibration test device as described in claim 12, wherein a plurality of securing holes is defined in the test platform, a plurality of securing holes being defined in the bottom sections of each base bracket, a plurality of fixing members being inserted through the securing holes of each base bracket and the platform for securing each base bracket on the test platform.

15. The vibration test device as described in claim 14, wherein the securing holes of the test platform are arranged in a matrix.

16. The vibration test assembly as described in claim 12, wherein each of the base brackets comprises a slanting rib connecting between the bottom section and the top section thereof.

17. The vibration test assembly as described in claim 11, wherein each of the sliding racks is securely attached between the mounting brackets of said one pair of opposite holders.

18. A vibration test device for an electronic device, comprising:

a test platform for imparting vibratory motion to the electronic device, the testing platform having an array of positioning holes;

a first and a second holder detachably mounted on the test platform, each of the first and second holders being configured for selectively engaging in at least one of the positioning holes, the first holder being spaced from and opposite to the second holder;

a first slide rack connected between the first and second holders and suspending over the test platform, the first slide rack having a first slide coupled to the first holder and a second slide coupled to the second holder, the second slide being slidable relative to the first slide;

a third and a fourth holder detachably mounted on the test platform, each of the third and fourth holders being configured for selectively engaging in at least one of the positioning holes so as to align with the first and second holders respectively, the third holder being spaced from and opposite to the fourth holder; and a second slide rack connected between the first and second holders and suspending over the test platform, the second slide rack being parallel to the first slide rack and having a third slide coupled to the third holder and a fourth slide coupled to the fourth holder, the third slide being slidable relative to the fourth slide.

19. The vibration test device as described in claim 18, wherein each of the holders comprises a pair of parallel base brackets attached to the test platform, and a mounting bracket attached to the base brackets for mounting the electronic device.

20. The vibration test device as described in claim 19, wherein the first slide rack is mounted to the mounting brackets of the first and second holders, and the second slide rack is mounted to the mounting brackets of the third and fourth holders.

* * * * *